United States Patent
Tomioka et al.

(10) Patent No.: US 9,638,890 B2
(45) Date of Patent: *May 2, 2017

(54) IMAGING LENS AND IMAGING APPARATUS

(71) Applicant: FUJIFILM Corporation, Tokyo (JP)

(72) Inventors: Ukyo Tomioka, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/854,316

(22) Filed: Sep. 15, 2015

(65) Prior Publication Data
US 2016/0085048 A1  Mar. 24, 2016

(30) Foreign Application Priority Data
Sep. 18, 2014  (JP) .................................. 2014-189787

(51) Int. Cl.
*G02B 9/64* (2006.01)
*G02B 15/16* (2006.01)

(52) U.S. Cl.
CPC ............. *G02B 9/64* (2013.01); *G02B 15/161* (2013.01)

(58) Field of Classification Search
CPC ...................................................... G02B 9/64
USPC ................................................ 359/755, 757
See application file for complete search history.

(56) References Cited

U.S. PATENT DOCUMENTS 7,483,221 B2 * 1/2009 Kitahara ............... G02B 13/22
 359/672
2013/0088786 A1 4/2013 Sugita

FOREIGN PATENT DOCUMENTS

JP 61-188512 8/1986
JP 2013-080151 5/2013

* cited by examiner

*Primary Examiner* — James Jones
(74) *Attorney, Agent, or Firm* — Young & Thompson

(57) ABSTRACT

An imaging lens consists of, disposed in order from the object side, a front group, a stop, and a rear group, wherein
the front group includes, in order from the most-object side, a positive first lens, a negative second lens, and a negative third lens which are adjacently disposed,
the rear group consists of two sets of cemented lenses having positive refractive powers and a positive single lens,
the object-side cemented lens is formed by cementing, in order form the object side, a positive lens with a convex surface toward the image side and a negative meniscus lens together,
the image-side cemented lens is formed by cementing, in order from the object side, a negative meniscus lens with a concave surface toward the image side and a positive lens together, and
the image-side cemented lens is disposed at the most-image side of the rear group.

19 Claims, 14 Drawing Sheets

EXAMPLE 1

IMAGING LENS AND IMAGING APPARATUS

CROSS-REFERENCE TO RELATED APPLICATIONS

The present application claims priority under 35 U.S.C. §119 to Japanese Patent Application No. 2014-189787, filed in Sep. 18, 2014. The above application is hereby expressly incorporated by reference, in its entirety, into the present application.

BACKGROUND OF THE INVENTION

Field of the Invention

The present invention relates to an imaging lens suitable for electronic cameras such as surveillance cameras, industrial cameras, single-lens reflex cameras, non-reflex type cameras, and the like as well as to an imaging apparatus equipped with this imaging lens.

Description of the Related Art

The number of pixels of image sensors is increasing in electronic cameras such as surveillance cameras, industrial cameras, single-lens reflex cameras, non-reflex type cameras, and the like, and there is demand for imaging lenses that favorably correct various aberrations accompanying these developments. In addition, there is also demand for imaging lenses that favorably correct small F numbers for the purpose of photographing in dark places and compositional intent, such as defocusing the background.

As imaging lenses to be used in electronic cameras as described above, imaging lenses of a two-group configuration including a front group and a rear group are known. Patent Documents 1 and 2 (Japanese Unexamined Patent Publication No. 61(1986)-188512 and Japanese Unexamined Patent Publication No. 2013-080151) disclose imaging lenses having such a configuration.

SUMMARY OF THE INVENTION

None of the imaging lenses of Patent Documents 1 and 2 have sufficiently small F numbers and correct various aberrations adequately. Therefore, there is demand for further high-performance imaging lenses.

The present invention has been developed in view of the foregoing circumstances. The object of the present invention is to provide an imaging lens that corrects various aberrations favorably having a small F number, and to provide an imaging apparatus equipped with this imaging lens.

An imaging lens of the present invention consisting of, in order from the object side, a front group, a stop, and a rear group, wherein the front group includes, in order from the most-object side, a first lens having a positive refractive power, a second lens having a negative refractive power, and a third lens having a negative refractive power which are adjacently disposed, the rear group consists of two sets of cemented lenses having positive refractive powers and a single lens having a positive refractive power, the object-side cemented lens of the two sets of cemented lenses is formed by cementing, in order from the object side, a positive lens with a convex surface toward the image side and a negative meniscus lens together, and the image-side cemented lens of the two sets of cemented lenses is formed by cementing, in order from the object side, a negative meniscus lens with a concave surface toward the image side and a positive lens together, the image-side cemented lens being disposed at the most-image side in the rear group.

In the imaging lens of the present invention, it is preferable for the second lens to be of a meniscus shape with a concave surface toward the image side.

It is preferable for the first lens to be of a shape with a convex surface toward the object side.

Further, it is preferable for the front group to include a final lens, having a positive refractive power, of the front group at the most-image side.

Further, it is preferable for conditional formulae (1) and (2) below to be satisfied. Note that it is more preferable for at least one of conditional formulae (1-1) and (2-1) below to be satisfied:

$$0.05 < NnA - NpA < 0.8 \tag{1}$$

$$0.25 < NnA - NpA < 0.6 \tag{1-1}$$

$$22 < vpA - vnA < 70 \tag{2}$$

$$25 < vpA - vnA < 65 \tag{2-1}$$

where,

NnA: the refractive index of the negative lens of the object-side cemented lens of the two sets of cemented lenses in the rear group with respect to the d line, NpA: the refractive index of the positive lens of the object-side cemented lens of the two sets of cemented lenses in the rear group with respect to the d line, vpA: the Abbe's number of the positive lens of the object-side cemented lens of the two sets of cemented lenses in the rear group with respect to the d line, and vnA: the Abbe's number of the negative lens of the object-side cemented lens of the two sets of cemented lenses in the rear group with respect to the d line.

Further, it is preferable for conditional formulae (3) and (4) below to be satisfied. Note that it is more preferable for at least one of conditional formulae (3-1) and (4-1) below to be satisfied:

$$0 < NnB - NpB < 0.8 \tag{3}$$

$$0.25 < NnB - NpB < 0.6 \tag{3-1}$$

$$22 < vpB - vnB < 70 \tag{4}$$

$$25 < vpB - vnB < 65 \tag{4-1}$$

where,

NnB: the refractive index of the negative lens of the image-side cemented lens of the two sets of cemented lenses in the rear group with respect to the d line, NpB: the refractive index of the positive lens of the image-side cemented lens of the two sets of cemented lenses in the rear group with respect to the d line vpB: the Abbe's number of the positive lens of the image-side cemented lens of the two sets of cemented lenses in the rear group with respect to the d line, and vnB: the Abbe's number of the negative lens of the image-side cemented lens of the two sets of cemented lenses in the rear group with respect to the d line.

Further, it is preferable for conditional formula (5) below to be satisfied. Note that it is more preferable for conditional formula (5-1) below to be satisfied:

$$-0.5<f/fF<0.2 \quad (5)$$

$$-0.45<f/fF<0.1 \quad (5\text{-}1)$$

where,
f: the focal length of the entire system, and
fF: the focal length of the front group.

Further, it is preferable for conditional formula (6) below to be satisfied. Note that it is more preferable for conditional formula (6-1) below to be satisfied:

$$-10<(Rc-Rd)/(Rc+Rd)\leq 0 \quad (6)$$

$$-2<(Rc-Rd)/(Rc+Rd)\leq 0 \quad (6\text{-}1)$$

where,
Rc: the radius of curvature of the image-side surface of a lens adjacent to the final lens of the front group in the front group, and
Rd: the radius of curvature of the object-side surface of the final lens of the front group.

Further, it is preferable for conditional formula (7) below to be satisfied. Note that it is more preferable for conditional formula (7-1) below to be satisfied:

$$0.1<fA/fB<10 \quad (7)$$

$$0.2<fA/fB<8 \quad (7\text{-}1)$$

where,
fA: the focal length of the object-side cemented lens of the two sets of cemented lenses in the rear group, and
fB: the focal length of the image-side cemented lens of the two sets of cemented lenses in the rear group.

It is preferable for conditional formula (8) below to be satisfied:

$$-2<f/f123<-0.3 \quad (8),$$

where,
f: the focal length of the entire system, and
f123: the combined focal length of the first lens through the third lens.

Further, the front group may consist of, in order from the object side, the first lens, the second lens, the third lens, a fourth lens having a negative refractive power and the final lens of the front group being disposed at the most-image side of the front group. Alternatively, the front group may consist of, in order from the object side, the first lens, the second lens, the third lens, a fourth lens being a meniscus lens with a concave surface toward the object side, a fifth lens being a negative meniscus lens with a concave surface toward the image side, and a final lens of the front group being disposed at the most-image side of the front group.

Further, the rear group may consist of, in order from the object side, the single lens, the object-side cemented lens, and the image-side cemented lens. Alternatively, rear group may consist of, in order from the object side, the object-side cemented lens, the single lens, and the image-side cemented lens.

An imaging apparatus of the present invention is equipped with the imaging lens of the present invention described above.

Note that the above expression "consist/consisting of" intends to include lenses that practically have no power, optical elements other than lenses such as a stop, a mask, a cover glass, a filter, and mechanical components such as lens flanges, a lens barrel, a camera shake correcting mechanism, etc., in addition to those listed above as the constituent elements.

Further, the surface shapes and the signs of the refractive powers of the above lenses should be considered in paraxial regions if aspherical surfaces are included therein.

An imaging lens of the present invention consists of, in order from the object side, a front group, a stop, and a rear group, wherein the front group includes, in order from the most-object side, a first lens having a positive refractive power, a second lens having a negative refractive power, and a third lens having a negative refractive power which are adjacently disposed, the rear group consists of two sets of cemented lenses having positive refractive powers, and a single lens having a positive refractive power, the object-side cemented lens of the two sets of cemented lenses is formed by cementing, in order from the object side, a positive lens with a convex surface toward the image side and a negative meniscus lens together, and the image-side cemented lens of the two sets of cemented lenses is formed by cementing, in order from the object side, a negative meniscus lens with a concave surface toward the image side and a positive lens together, the image-side cemented lens being disposed at the most-image side of the rear group. Such a configuration enables an imaging lens that corrects various aberrations favorably having a small F number.

Further, an imaging apparatus of the present invention is equipped with the imaging lens of the present invention. Therefore, bright and high-quality images can be obtained.

DESCRIPTION OF THE PREFERRED EMBODIMENTS

Figure 1:
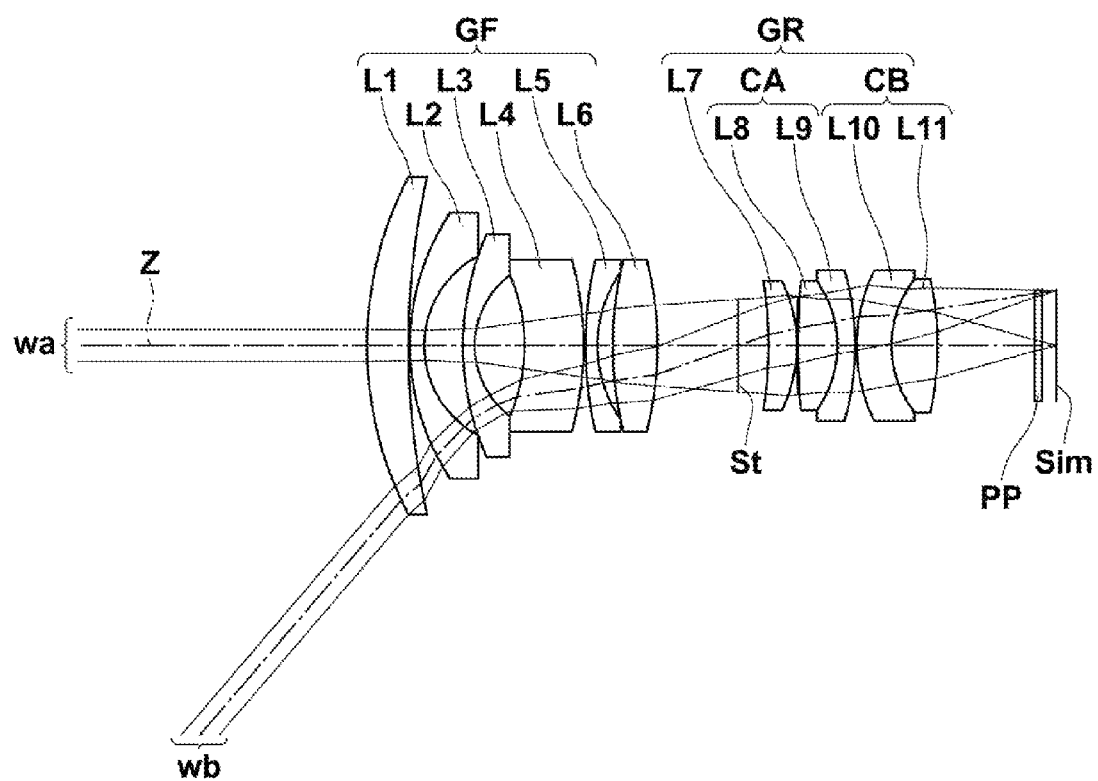
FIG. 1 is a cross-sectional diagram that illustrates the lens configuration of an imaging lens (the same as that of Example 1) according to an embodiment of the present invention.

Hereinafter, embodiments of the present invention will be described in detail with reference to the accompanying drawings. FIG. 1 is a cross-sectional view that illustrates the lens configuration of an imaging lens according to an embodiment of the present invention. The example of the configuration illustrated in FIG. 1 is the same as that of the imaging lens in Example 1 to be described later. In FIG. 1, the left side is the object side, and the right side is the image side. The stop St illustrated in FIG. 1 does not necessarily represent the size or shape thereof, but the positions thereof along the optical axis Z. Further, FIG. 1 represents axial light rays wa and light rays wb having a maximum angle of view.

As illustrated in FIG. 1, this imaging lens consists of, in order from the object side, a front group GF, a stop St, and a rear group GR.

When this imaging lens is applied to imaging apparatuses, it is preferable for a cover glass, a prism, various types of filters, such as infrared cut filters and low-pass filters to be provided between the optical system and the image surface Sim according to the configurations of a camera on which the lens is mounted. Accordingly, FIG. 1 illustrates an example in which a plane parallel optical member PP that presumes such components is disposed between the lens system and the image surface Sim.

The front group GF includes, in order from the most-object side, a first lens L1 having a positive refractive power, a second lens L2 having a negative refractive power, and a third lens L3 having a negative refractive power, which are adjacently disposed.

Configuring the first lens L1 to have a positive refractive power in such a manner is advantageous from the viewpoint of correcting lateral chromatic aberration and shortening the total length. In addition, by configuring the second lens L2 to have a negative refractive power, the incident angles of light rays at peripheral angles of view with respect to the rear group GR can be suitably reduced, and the generation of astigmatism can be reduced. Further, by configuring the third lens L3 to have a negative refractive power, the incident angles of light rays at peripheral angles of view with respect to the rear group GR can be suitably reduced, and the generation of astigmatism can be reduced as well.

The rear group GR consists of two sets of cemented lenses having positive refractive powers, and a single lens L7 having a positive refractive power. The object-side cemented lens CA of the two sets of cemented lenses is formed by cementing, in order from the object side, a positive lens L8 with a convex surface toward the image side and a negative meniscus lens L9 together. The image-side cemented lens CB is formed by cementing, in order from the object side, a negative meniscus lens L10 with a concave surface toward the image side and a positive lens L11 together. This image-side cemented lens CB is disposed at the most-image side in the rear group GR.

By configuring the rear group GR to include two sets of cemented lenses CA and CB having positive refractive powers in such a manner, longitudinal chromatic aberration and lateral chromatic aberration can be corrected at the cemented surfaces of the cemented lenses. In addition, by distributing positive refractive powers among the two sets of cemented lenses CA and CB and a single lens L7, the refractive power of the entire lens system can be secured while suppressing the generation of spherical aberration. Further, by setting the positive refractive power at the most-image side, the incident angles of chief rays at peripheral angles of view with respect to the image surface can be suitably reduced. By configuring the object-side cemented lens CA in such a manner as described above, spherical aberration and longitudinal chromatic aberration can be corrected while suppressing the generation of astigmatism and the generation of differences in longitudinal chromatic aberration depending angles of view. Further, by configuring the image-side cemented lens CB in such a manner described above, longitudinal chromatic aberration and lateral chromatic aberration can be corrected while suppressing the generation of higher order spherical aberration and the generation of differences in spherical aberration depending on wavelengths.

In the imaging lens of the present embodiment, it is preferable for the second lens L2 to be of a meniscus shape with a concave surface toward the image side. Such a configuration enables the generation of astigmatism to be suppressed while suppressing the fluctuations in astigmatism due to changes in the object distance.

Further, it is preferable for the first lens L1 to be of a shape with a convex surface toward the object side. Such a configuration enables the generation of astigmatism to be suppressed and the total length to be shortened. Note that when the first lens L1 is configured to be a meniscus lens, astigmatism can be corrected more preferably, and lateral chromatic aberration and distortion can be prevented from being excessively corrected at large angles of view. This will be advantageous from the viewpoint of widening angles of view.

Further, it is preferable for the sixth lens L6 (which corresponds to a final lens of the front group in the present invention), which is disposed at the most-image-side in the front group GF, to be a positive lens. Such a configuration enables the incident angles of the axial light rays with respect to the rear group to be reduced while suppressing the generation of spherical aberration.

Further, it is preferable for conditional formulae (1) and (2) below to be satisfied. By configuring the imaging lens such that the value of NnA−NpA is not greater than or equal to the upper limit defined by conditional formula (1), spherical aberration can be prevented from being excessively corrected. Further, by configuring the imaging lens such that the value of NnA−NpA is not less than or equal to the lower limit defined by conditional formula (1), spherical aberration can be prevented from being insufficiently corrected. By configuring the imaging lens such that the value of vpA−vnA is not greater than or equal to the upper limit defined by conditional formula (2), longitudinal chromatic aberration can be prevented from being excessively corrected. In addition, by configuring the imaging lens such that the value of vpA−vnA is not less than or equal to the lower limit defined by conditional formula (2), longitudinal chromatic aberration can be prevented from being insufficiently corrected. Note that more favorable characteristics can be obtained by satisfying at least one of conditional formulae (1-1) and (2-1) below:

$$0.05 < NnA - NpA < 0.8 \quad (1)$$

$$0.25 < NnA - NpA < 0.6 \quad (1\text{-}1)$$

$$22 < \nu pA - \nu nA < 70 \quad (2)$$

$$25 < \nu pA - \nu nA < 65 \quad (2\text{-}1)$$

where,
NnA: the refractive index of the negative lens of the object-side cemented lens of the two sets of cemented lenses in the rear group with respect to the d line,
NpA: the refractive index of the positive lens of the object-side cemented lens of the two sets of cemented lenses in the rear group with respect to the d line,
$\nu pA$: the Abbe's number of the positive lens of the object-side cemented lens of the two sets of cemented lenses in the rear group with respect to the d line, and
$\nu nA$: the Abbe's number of the negative lens of the object-side cemented lens of the two sets of cemented lenses in the rear group with respect to the d line.

Further, it is preferable for conditional formulae (3) and (4) below to be satisfied. By configuring the imaging lens such that the value of NnB−NpB is not greater than or equal to the upper limit defined by conditional formula (3), spherical aberration can be prevented from being excessively corrected. In addition, by configuring the imaging lens such that the value of NnB−NpB is not less than or equal to the lower limit defined by conditional formula (3), spherical aberration can be prevented from being insufficiently corrected. By configuring the imaging lens such that the value of $\nu pB - \nu nB$ is not greater than or equal to the upper limit defined by conditional formula (4), longitudinal chromatic aberration can be prevented from being excessively corrected. In addition, by configuring the imaging lens such that the value of $\nu pB - \nu nB$ is not less than or equal to the lower limit defined by conditional formula (4), longitudinal chromatic aberration can be prevented from being insufficiently corrected. Note that more favorable characteristics can be obtained by satisfying at least one of conditional formulae (3-1) and (4-1) below:

$$0 < NnB - NpB < 0.8 \quad (3)$$

$$0.25 < NnB - NpB < 0.6 \quad (3\text{-}1)$$

$$22 < \nu pB - \nu nB < 70 \quad (4)$$

$$25 < \nu pB - \nu nB < 65 \quad (4\text{-}1)$$

where,
NnB: the refractive index of the negative lens of the image-side cemented lens of the two sets of cemented lenses in the rear group with respect to the d line,
NpB: the refractive index of the positive lens of the image-side cemented lens of the two sets of cemented lenses in the rear group with respect to the d line,
$\nu pB$: the Abbe's number of the positive lens of the image-side cemented lens of the two sets of cemented lenses in the rear group with respect to the d line, and
$\nu nB$: the Abbe's number of the negative lens of the image-side cemented lens of the two sets of cemented lenses in the rear group with respect to the d line.

Further, it is preferable for conditional formula (5) below to be satisfied. By configuring the imaging lens such that the value of f/fF is not greater than or equal to the upper limit defined by conditional formula (5), a suitable amount of back focus can be maintained. In addition, by configuring the imaging lens such that the value of f/fF is not less than or equal to the lower limit defined by conditional formula (5), an increase in spherical aberration can be prevented, because the amount of the refractive power borne by the rear group GR will not increase excessively. Note that more favorable characteristics can be obtained by satisfying conditional formula (5-1) below:

$$-0.5 < f/fF < 0.2 \quad (5)$$

$$-0.45 < f/fF < 0.1 \quad (5\text{-}1)$$

where,
f: the focal length of the entire system, and
fF: the focal length of the front group.

Further, it is preferable for conditional formula (6) below to be satisfied. By configuring the imaging lens such that the value of (Rc−Rd)/(Rc+Rd) does not exceed the upper limit defined by conditional formula (6), spherical aberration can be prevented from being insufficiently corrected. In addition, by configuring the imaging lens such that the value of (Rc−Rd)/(Rc+Rd) is not less than or equal to the lower limit defined by conditional formula (6), spherical aberration can be prevented from being excessively corrected. Note that more favorable characteristics can be obtained by satisfying conditional formula (6-1) below:

$$-10 < (Rc-Rd)/(Rc+Rd) \leq 0 \quad (6)$$

$$-2 < (Rc-Rd)/(Rc+Rd) \leq 0 \quad (6\text{-}1)$$

where,
Rc: the radius of curvature of the image-side surface of a lens adjacent to the final lens of the front group in the front group, and
Rd: the radius of curvature of the object-side surface of the final lens of the front group.

Further, it is preferable for conditional formula (7) below to be satisfied. By satisfying conditional formula (7), refractive power can be appropriately distributed, resulting in the generation of spherical aberration being prevented. In addition, by configuring the imaging lens such that the value of fA/fB is not less than or equal to the lower limit defined by conditional formula (7), the incident angles of the chief rays at peripheral angles of view with respect to the image surface can be suitably suppressed. Note that more favorable characteristics can be obtained by satisfying conditional formula (7-1) below:

$$0.1 < fA/fB < 10 \quad (7)$$

$$0.2 < fA/fB < 8 \quad (7\text{-}1)$$

where,
fA: the focal length of the object-side cemented lens of the two sets of cemented lenses in the rear group, and
fB: the focal length of the image-side cemented lens of the two sets of cemented lenses in the rear group.

Further, it is preferable for conditional formula (8) below to be satisfied. By configuring the imaging lens such that the value of f/f123 is not greater than or equal to the upper limit defined by conditional formula (8), a suitable amount of back focus can be maintained. Further, the incident angles of light rays at peripheral angles of view with respect to the rear group GR can be suitably reduced, and the generation of astigmatism can be decreased. Further, by configuring the imaging lens such that the value of f/f123 is not less than or equal to the lower limit defined by conditional formula (8), spherical aberration can be prevented from becoming worse, and the increase in the total length can be prevented. Note that more favorable characteristics can be obtained by satisfying conditional formula (8-1) below:

$$-2 < f/f123 < -0.3 \quad (8)$$

$$-1.5 < f/f123 < -0.4 \quad (8\text{-}1)$$

where,
f: the focal length of the entire system, and
f123: the combined focal length of the first lens through the third lens.

Further, in the imaging lens of the present embodiment, the front group GF consists of, in order from the object side, a first lens L1, a second lens L2, a third lens L3, a fourth lens L4, a fifth lens L5, and a sixth lens L6 (a final lens of the front group). Further, the fourth lens L4 is a meniscus lens with a concave surface toward the object side, and the fifth lens L5 is a negative meniscus lens with a concave surface toward the image side. By configuring the fourth lens L4, which is disposed on the object side of the stop St, to be a meniscus lens with a concave surface toward the object side, pupil aberration will generate because a concave surface is on the object side, and a convex surface is on the image side. Further, the position of the entrance pupil will be closer to the object side as angles of view become greater, and the height, at which light rays at the outermost angles pass the most-object-side surface, will become low. Thereby, the outer diameter of the first lens L1 can be reduced. Further, by configuring the fifth lens L5 to be a negative lens, spherical aberration can be corrected. In addition, by configuring the fifth lens L5 to be a negative meniscus lens with a concave surface toward the image side, spherical aberration and field curvature in the tangential direction can be balanced.

Note that the front group GF may consist of, in order from the object side, the first lens, the second lens, the third lens, the fourth lens, and the fifth lens (the final lens of the front group). Further, the fourth lens may have a negative refractive power. By configuring the fourth lens to have a negative refractive power in such a manner, the incident angles of the light rays at peripheral angles of view with respect to the rear group GR can be suitably reduced, and the generation of astigmatism can be decreased.

Further, in the imaging lens of the present embodiment, the rear group GR consists of, in order form the object side, a single lens L7, the object-side cemented lens CA, and the image-side cemented lens CB. By configuring the two sets of cemented lenses to be disposed on the image side in such a manner, lateral chromatic aberration can be easily corrected.

Note that the rear group GR may consist of, in order from the object side, the object-side cemented lens, the single lens, and the image-side cemented lens. By configuring the two sets of cemented lenses to be spaced apart from each other in such a manner, longitudinal chromatic aberration and lateral chromatic aberration can be easily balanced.

Moreover, in the case that the present zoom lens is used in environments in which lenses are easily damaged, it is preferable for a multi-layer film coating for protection to be applied onto lenses. Moreover, in addition to a coating for protection, an antireflection coating may be applied onto lenses so as to reduce ghost light, and the like when using the lenses.

Further, FIG. 1 illustrates the example in which an optical member PP is disposed between a lens system and an image surface Sim. Instead of disposing a low-pass filter, various kinds of filters which cut specific wavelength ranges, and the like between the lens system and the image surface Sim, these various kinds of filters may be disposed between lenses, or a coating, which exhibits the same effects as the various kinds of filters, may be applied onto the lens surfaces of any of the lenses.

Next, the Examples of numerical values of the imaging lens of the present invention will be described.

First, the description will start with an imaging lens of Example 1. FIG. 1 is a cross-sectional view of the lens configuration of the imaging lens of Example 1. Note that the left side is the object side and the right side is the image side in FIG. 1 and FIGS. 2 through 6 which correspond to Examples 2 through 6 to be described later. Further, each of the stop St illustrated in the Figures does not necessarily represent the size or shape thereof, but the position thereof along the optical axis Z.

In the imaging lens of Example 1, a front group GF consists of six lenses, and a rear group GR consists of five lenses in which a single lens L7, the object-side cemented lens CA, and the image-side cemented lens CB are disposed in order from the object side.

Table 1 shows basic lens data of the imaging lens in Example 1, and Table 2 shows data regarding specs. The following will describe the meanings of items represented in the Tables by using Example 1 as an example. The same basically applies to Examples 2 through 6.

In the lens data in Table 1, the column of the surface numbers shows the respective surface numbers that sequentially increase toward the image side, with the surface of the constituent element at the most-object designated as first, the column of the radii of curvature shows the radii of curvature of the respective surfaces, and the column of the distances between surfaces shows the distances between each surface and a surface next thereto along the optical axis Z. In addition, the column of nd shows the refractive indices of the respective optical elements with respect to the d line (wavelength: 587.6 nm), and the column of vd shows the Abbe's numbers of the respective optical elements with respect to the d line (wavelength: 587.6 nm).

Here, the signs of the radius of curvature are are positive when a surface shape is convex on the object side, and negative when a surface shape is convex on the image side. The basic lens data represents a stop St and an optical member PP as well. The column of the surface number of a surface corresponding to the stop St indicates a surface number and the letters (stop).

The data regarding specs in Table 2 shows focal length f', back focus Bf', an F number FNo., and a full angle of view 2ω).

In basic lens data and data regarding specs, degrees are used as the unit of angles, and mm is used as the unit of length, but other appropriate units may also be used, as optical systems are usable even when they are proportionally enlarged or miniaturized.

TABLE 1

| SURFACE NUMBERS | RADII OF CURVATURE | DISTANCES BETWEEN SURFACES | nd | vd |
|---|---|---|---|---|
| 1 | 25.33324 | 2.890 | 1.51680 | 64.20 |
| 2 | 53.76621 | 0.100 | | |
| 3 | 16.66871 | 1.000 | 1.71299 | 53.87 |
| 4 | 7.08951 | 2.690 | | |
| 5 | 19.08279 | 0.820 | 1.71299 | 53.87 |
| 6 | 6.13314 | 3.470 | | |

TABLE 1-continued

| SURFACE NUMBERS | RADII OF CURVATURE | DISTANCES BETWEEN SURFACES | nd | νd |
|---|---|---|---|---|
| 7 | −12.37312 | 4.100 | 1.48749 | 70.24 |
| 8 | −22.80160 | 0.150 | | |
| 9 | 26.76491 | 0.820 | 1.48749 | 70.24 |
| 10 | 8.86360 | 1.090 | | |
| 11 | 24.23688 | 3.110 | 1.83400 | 37.16 |
| 12 | −24.23688 | 5.590 | | |
| 13(STOP) | ∞ | 2.140 | | |
| 14 | −28.29463 | 1.960 | 1.74400 | 44.79 |
| 15 | −10.43002 | 0.100 | | |
| 16 | 54.56991 | 2.740 | 1.48749 | 70.24 |
| 17 | −7.74400 | 1.220 | 1.84666 | 23.78 |
| 18 | −19.35499 | 0.110 | | |
| 19 | 11.75932 | 2.430 | 1.90366 | 31.31 |
| 20 | 7.51500 | 3.210 | 1.49700 | 81.54 |
| 21 | −20.81916 | 6.770 | | |
| 22 | ∞ | 0.500 | 1.51633 | 64.14 |
| 23 | ∞ | 0.996 | | |

TABLE 2

EXAMPLE 1/SPECS (d line)

| f | 4.090 |
|---|---|
| Bf | 8.096 |
| FNo. | 1.85 |
| 2ω[°] | 98.8 |

Figure 7:
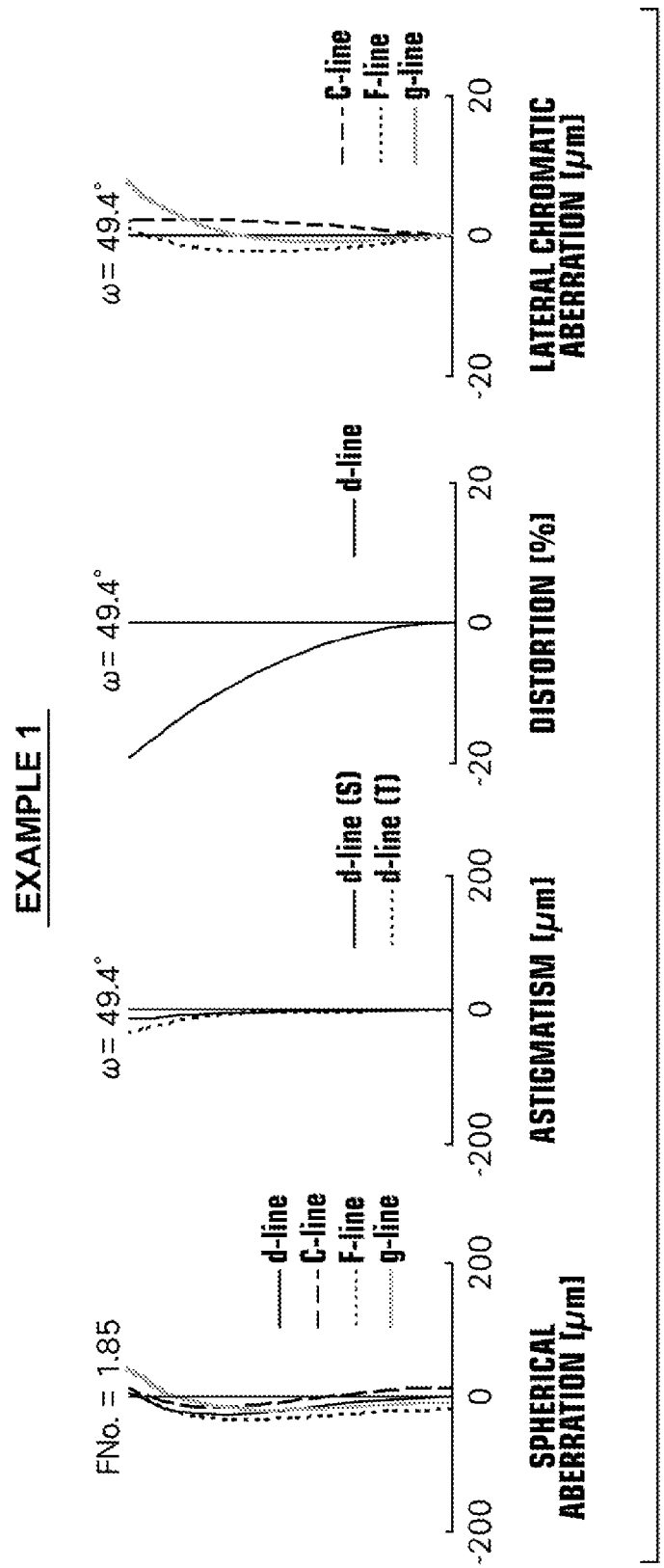
FIG. 7 is a collection of diagrams that illustrate aberrations of the imaging lens in Example 1 of the present invention.

FIG. 7 illustrates aberration diagrams of the imaging lens of Example 1. Note that the diagrams of FIG. 7 respectively illustrate, in order from the left, spherical aberration, astigmatism, distortion, and lateral chromatic aberration. Each of the aberration diagrams that illustrate spherical aberration, astigmatism, and distortion illustrates aberration using the d line (wavelength: 587.6 nm) as a reference wavelength. The diagram that illustrate spherical aberration show aberrations with respect to the d line (wavelength: 587.6 nm), the C line (wavelength: 656.3 nm), the F line (wavelength: 486.1 nm), and the g line (wavelength: 435.8 nm) which are respectably indicated by a solid line, a long broken line, a short broken line, and a gray solid line. In the diagram that illustrates astigmatism, aberration in the sagittal direction is indicated by a solid line, and aberration in the tangential direction is indicated by a short broken line. In addition, the diagram that illustrates lateral chromatic aberration shows aberrations with respect to the C line (wavelength: 656.3 nm), the F line (wavelength: 486.1 nm), and the g line (wavelength: 435.8 nm) which are respectably indicated by a long broken line, a short broken line, and a gray solid line. Note that all of these aberrations are for when the imaging lens is focused at an object at infinity. In addition, "FNo." in the diagram that illustrates spherical aberration denotes an F number, and "ω" in the other aberration diagram denotes a half angle of view.

As the items in the data, the meanings thereof, and the manners in which they are shown in the descriptions for Example 1 above apply to the Examples below, redundant descriptions thereof will be omitted unless otherwise noted.

Figure 2:
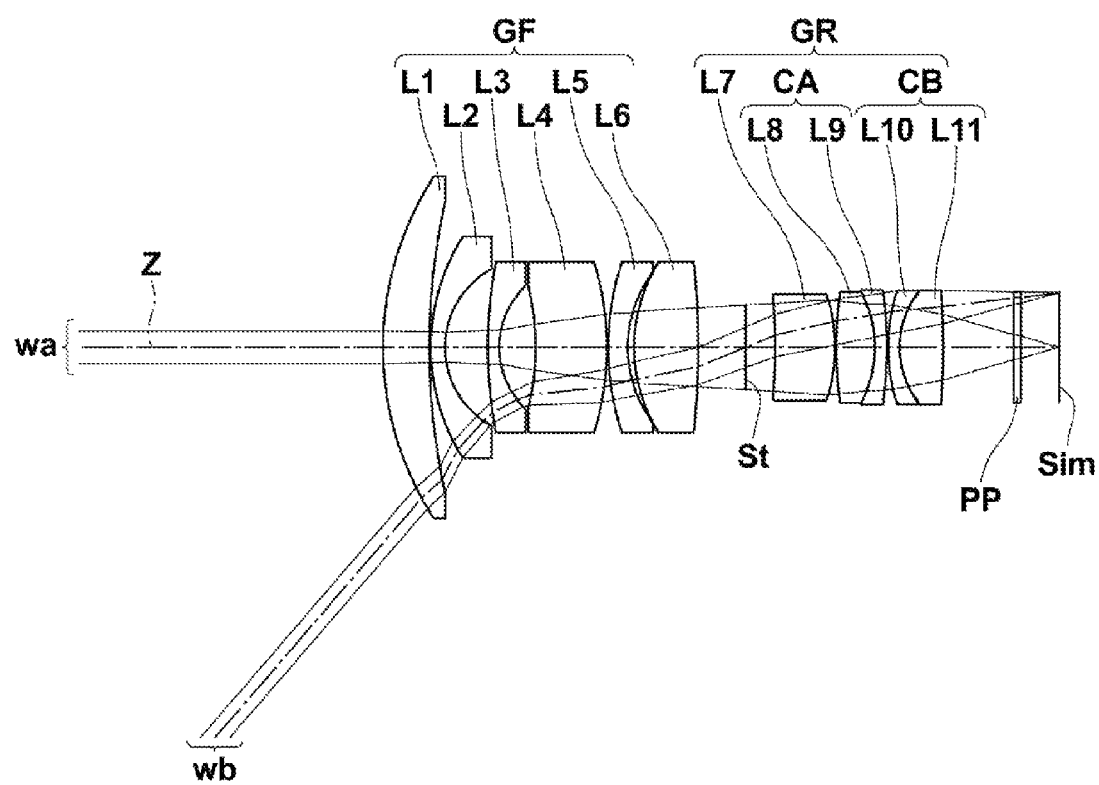
FIG. 2 is a cross-sectional diagram that illustrates the lens configuration of an imaging lens in Example 2 of the present invention.
Figure 8:
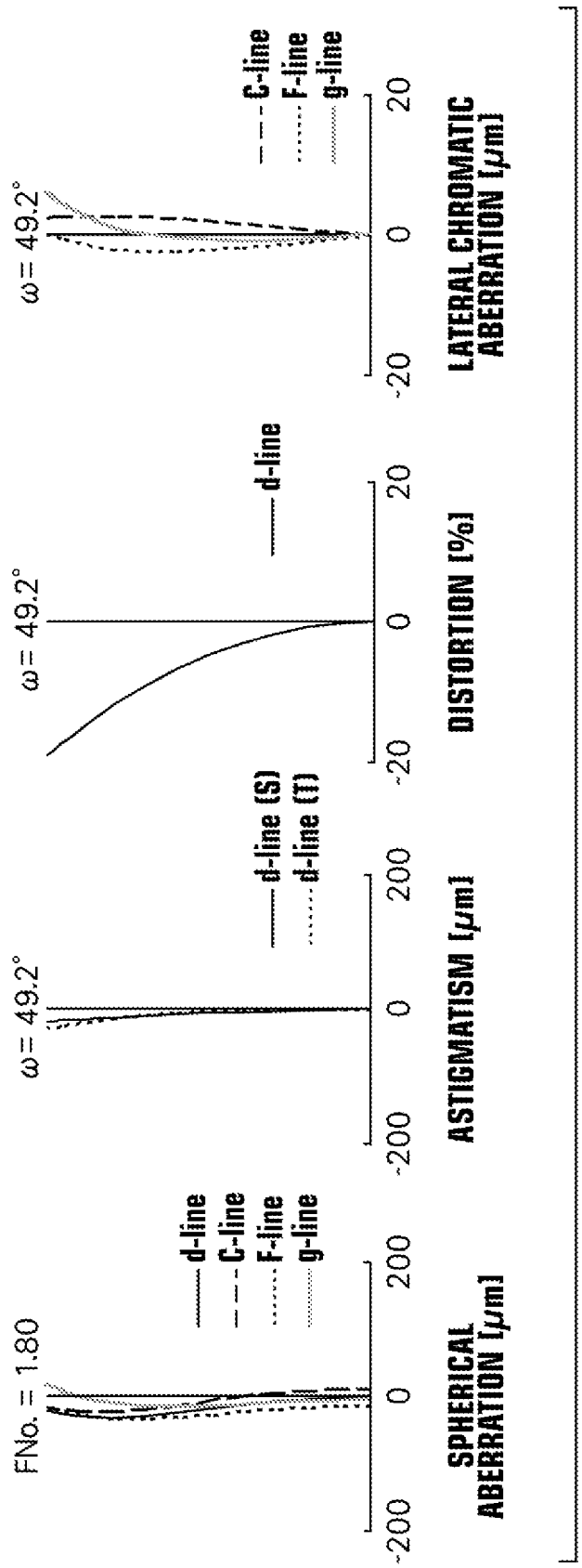
FIG. 8 is a collection of diagrams that illustrate aberrations of the imaging lens in Example 2 of the present invention.

Next, an imaging lens of Example 2 will be described. The imaging lens of Example 2 has the same configurations of the lens groups as those of the imaging lens in Example 1. FIG. 2 is a cross-sectional view illustrating the lens configuration of the imaging lens of Example 2. Further, regarding the imaging lens of Example 2, Table 3 shows basic lens data, Table 4 shows data regarding specs, and FIG. 8 illustrates the aberrations.

TABLE 3

EXAMPLE 2/LENS DATA

| SURFACE NUMBERS | RADII OF CURVATURE | DISTANCES BETWEEN SURFACES | nd | νd |
|---|---|---|---|---|
| 1 | 21.95221 | 3.260 | 1.51633 | 64.14 |
| 2 | 48.44357 | 0.100 | | |
| 3 | 14.66909 | 1.000 | 1.71299 | 53.87 |
| 4 | 6.31383 | 3.005 | | |
| 5 | 32.14966 | 0.800 | 1.71299 | 53.87 |
| 6 | 5.98668 | 2.559 | | |
| 7 | −17.64405 | 5.000 | 1.80000 | 25.00 |
| 8 | −20.49538 | 0.100 | | |
| 9 | 18.73879 | 1.387 | 1.80000 | 26.36 |
| 10 | 8.85934 | 0.449 | | |
| 11 | 11.36478 | 4.500 | 1.79999 | 29.90 |
| 12 | −56.36876 | 3.324 | | |
| 13(STOP) | ∞ | 2.080 | | |
| 14 | −42.91383 | 4.204 | 1.74734 | 53.27 |
| 15 | −12.08141 | 0.100 | | |
| 16 | 29.86304 | 2.702 | 1.61800 | 63.33 |
| 17 | −8.45189 | 0.837 | 1.90000 | 25.62 |
| 18 | −29.05389 | 0.100 | | |
| 19 | 13.25979 | 0.810 | 1.50736 | 53.64 |
| 20 | 6.37036 | 3.036 | 1.49700 | 81.54 |
| 21 | −64.28962 | 5.000 | | |
| 22 | ∞ | 0.500 | 1.51633 | 64.14 |
| 23 | ∞ | 2.694 | | |

TABLE 4

EXAMPLE 2/SPECS (d line)

| f | 4.098 |
|---|---|
| Bf | 8.024 |
| FNo. | 1.80 |
| 2ω[°] | 98.4 |

Figure 3:
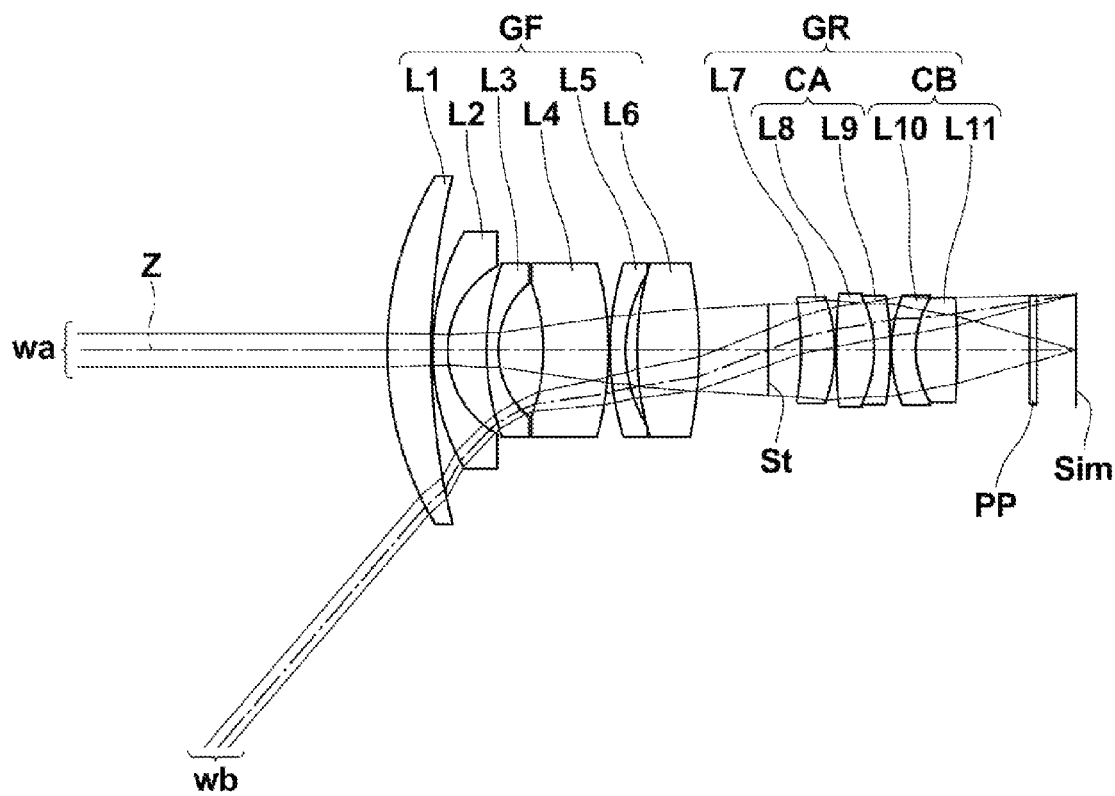
FIG. 3 is a cross-sectional diagram that illustrates the lens configuration of an imaging lens in Example 3 of the present invention.
Figure 9:
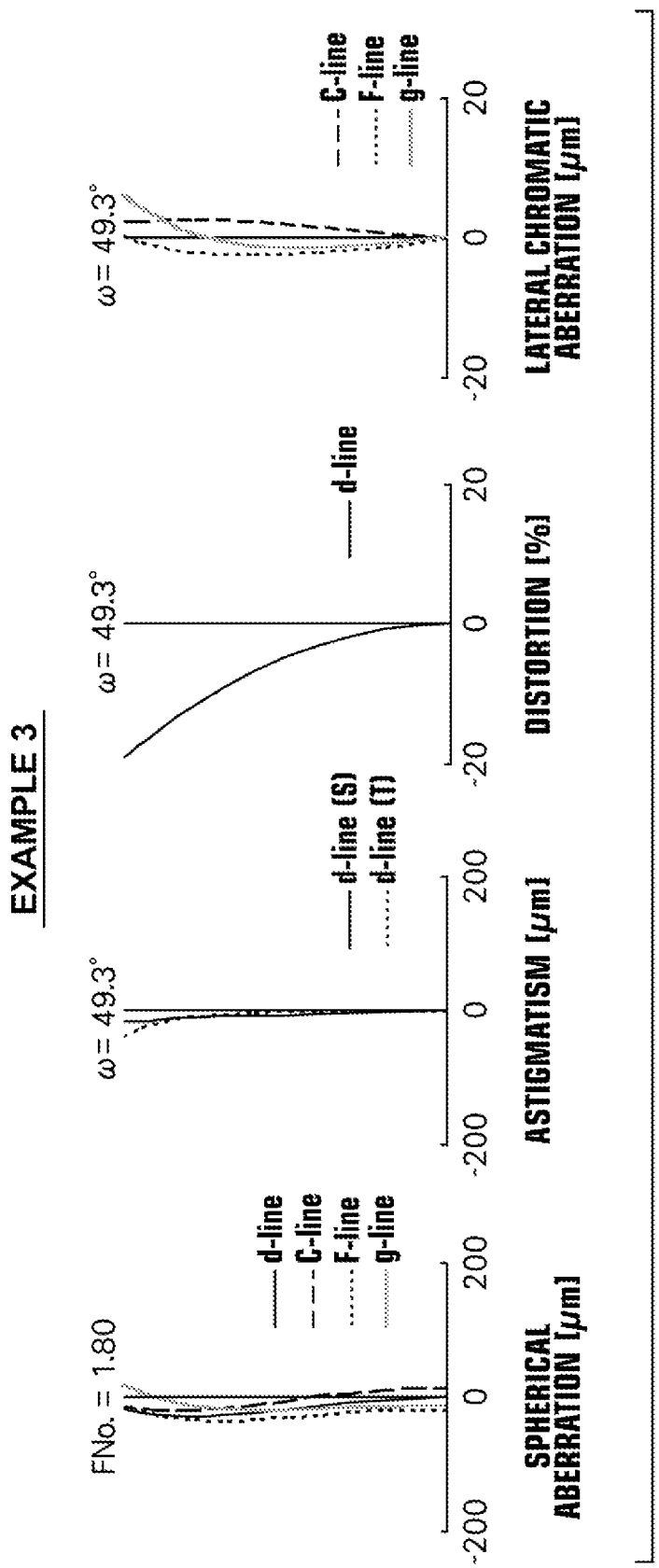
FIG. 9 is a collection of diagrams that illustrate aberrations of the imaging lens in Example 3 of the present invention.

Next, an imaging lens of Example 3 will be described. The imaging lens of Example 3 has the same configurations of the lens groups as those of the imaging lens in Example 1. FIG. 3 is a cross-sectional view illustrating the lens configuration of the imaging lens of Example 3. Further, regarding the imaging lens of Example 3, Table 5 shows basic lens data, Table 6 shows data regarding specs, and FIG. 9 illustrates the aberrations.

TABLE 5

EXAMPLE 3/LENS DATA

| SURFACE NUMBERS | RADII OF CURVATURE | DISTANCES BETWEEN SURFACES | nd | νd |
|---|---|---|---|---|
| 1 | 23.43143 | 3.034 | 1.51633 | 64.14 |
| 2 | 49.66266 | 0.100 | | |
| 3 | 16.43232 | 1.039 | 1.71299 | 53.87 |
| 4 | 6.63415 | 2.683 | | |
| 5 | 17.56424 | 0.800 | 1.71299 | 53.87 |
| 6 | 6.12874 | 3.103 | | |
| 7 | −13.47581 | 4.510 | 1.48749 | 70.24 |
| 8 | −22.84891 | 0.100 | | |
| 9 | 19.48408 | 1.086 | 1.80000 | 35.83 |
| 10 | 9.99724 | 0.791 | | |
| 11 | 20.70216 | 4.282 | 1.90366 | 31.31 |
| 12 | −28.69230 | 4.777 | | |
| 13(STOP) | ∞ | 2.252 | | |
| 14 | −21.36800 | 2.317 | 1.71299 | 53.87 |
| 15 | −10.60228 | 0.100 | | |
| 16 | 36.49841 | 2.626 | 1.61800 | 63.33 |
| 17 | −8.50020 | 1.104 | 1.88318 | 24.65 |
| 18 | −24.86007 | 0.100 | | |
| 19 | 10.25621 | 1.675 | 1.89959 | 38.04 |

TABLE 5-continued

EXAMPLE 3/LENS DATA

| SURFACE NUMBERS | RADII OF CURVATURE | DISTANCES BETWEEN SURFACES | nd | vd |
|---|---|---|---|---|
| 20 | 7.05702 | 2.853 | 1.49700 | 81.54 |
| 21 | −50.72202 | 5.000 | | |
| 22 | ∞ | 0.500 | 1.51633 | 64.14 |
| 23 | ∞ | 2.695 | | |

TABLE 6

EXAMPLE 3/SPECS (d line)

| f | 4.089 |
|---|---|
| Bf | 8.025 |
| FNo. | 1.80 |
| 2ω[°] | 98.6 |

Figure 4:
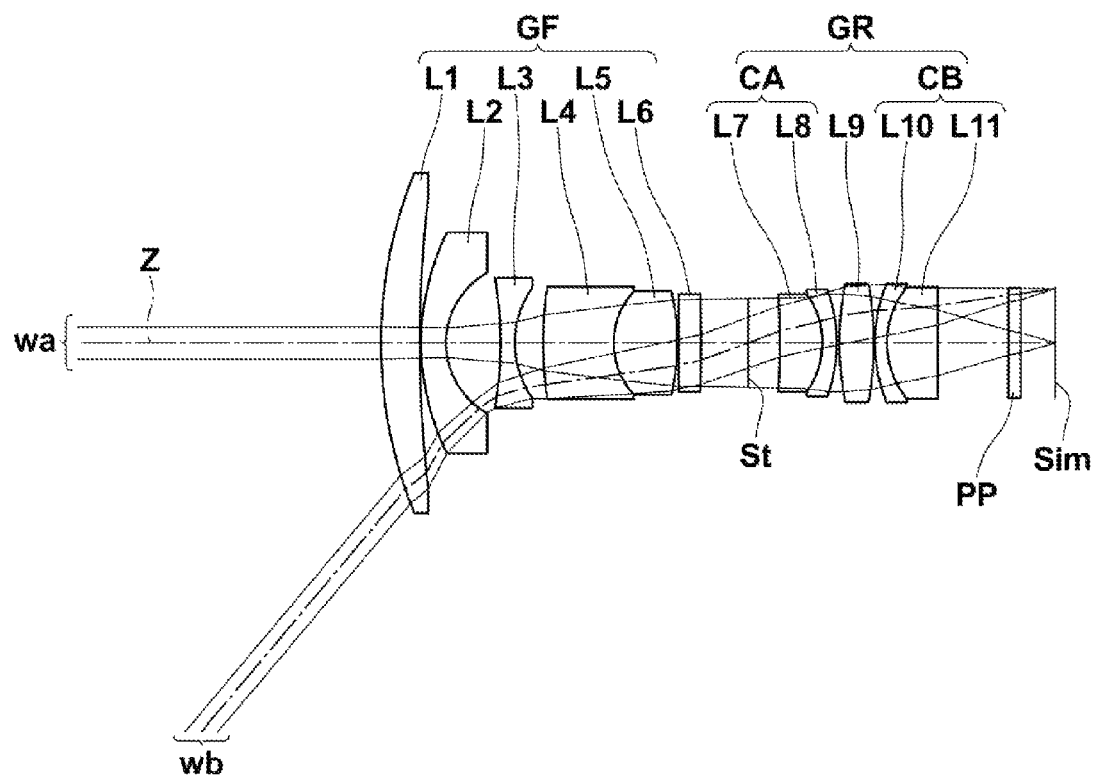
FIG. 4 is a cross-sectional diagram that illustrates the lens configuration of an imaging lens in Example 4 of the present invention.
Figure 10:
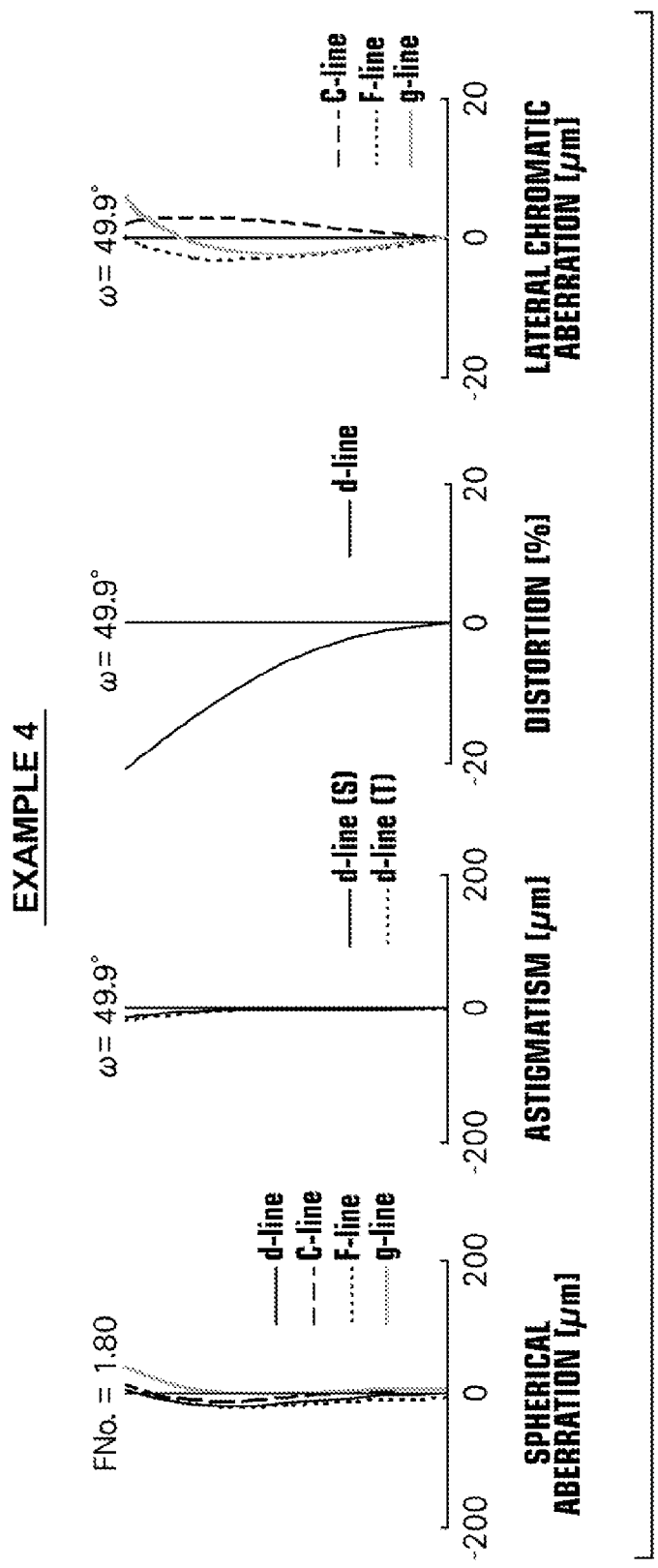
FIG. 10 is a collection of diagrams that illustrate aberrations of the imaging lens in Example 4 of the present invention.

Next, an imaging lens of Example 4 will be described. In the imaging lens of Example 4, a front group GF constitutes of six lenses, and a rear group GR consists of five lenses in which the object-side cemented lens CA, a single lens L9, and the image-side cemented lens CB are disposed in order from the object side. FIG. 4 is a cross-sectional view illustrating the lens configuration of the imaging lens of Example 4. Further, Table 7 shows basic lens data, Table 8 shows data regarding specs, and FIG. 10 illustrates the aberrations.

TABLE 7

EXAMPLE 4/LENS DATA

| SURFACE NUMBERS | RADII OF CURVATURE | DISTANCES BETWEEN SURFACES | nd | vd |
|---|---|---|---|---|
| 1 | 31.83411 | 2.741 | 1.51633 | 64.14 |
| 2 | 89.60864 | 0.100 | | |
| 3 | 17.62935 | 1.750 | 1.80518 | 25.42 |
| 4 | 5.69786 | 3.870 | | |
| 5 | −25.73877 | 1.000 | 1.63061 | 59.97 |
| 6 | 6.89109 | 1.997 | | |
| 7 | 26.75278 | 5.010 | 1.73942 | 29.55 |
| 8 | 5.38580 | 4.500 | 1.76904 | 27.90 |
| 9 | −16.08917 | 0.100 | | |
| 10 | 379.80485 | 1.577 | 1.66072 | 32.91 |
| 11 | −96.84457 | 3.321 | | |
| 12(STOP) | ∞ | 2.237 | | |
| 13 | −60.48376 | 3.018 | 1.48749 | 70.24 |
| 14 | −5.95210 | 1.002 | 1.84666 | 23.78 |
| 15 | −11.19595 | 0.200 | | |
| 16 | 21.24954 | 2.409 | 1.71299 | 53.87 |
| 17 | −24.76665 | 0.100 | | |
| 18 | 11.29793 | 0.845 | 1.90366 | 31.31 |
| 19 | 6.23711 | 3.572 | 1.49700 | 81.54 |
| 20 | ∞ | 5.000 | | |
| 21 | ∞ | 0.900 | 1.51633 | 64.14 |
| 22 | ∞ | 2.422 | | |

TABLE 8

EXAMPLE 4/SPECS (d line)

| f | 4.094 |
|---|---|
| Bf | 8.016 |
| FNo. | 1.80 |
| 2ω[°] | 99.8 |

Figure 5:
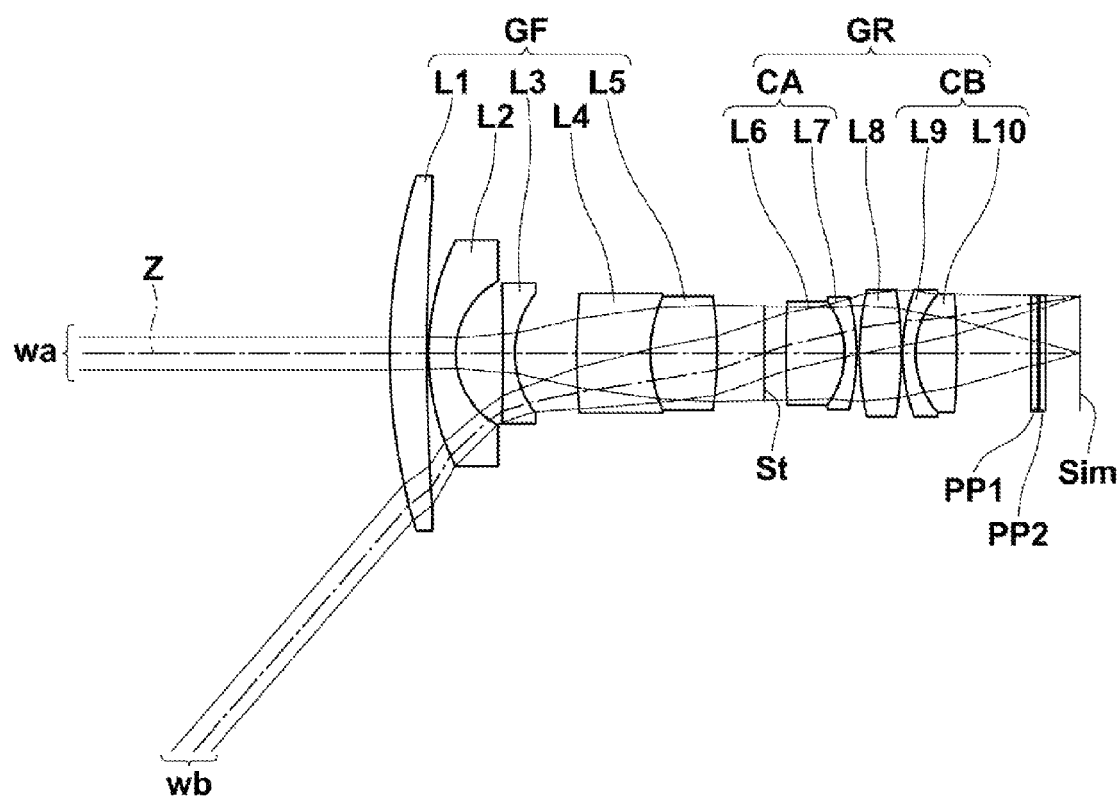
FIG. 5 is a cross-sectional diagram that illustrates the lens configuration of an imaging lens in Example 5 of the present invention.
Figure 11:
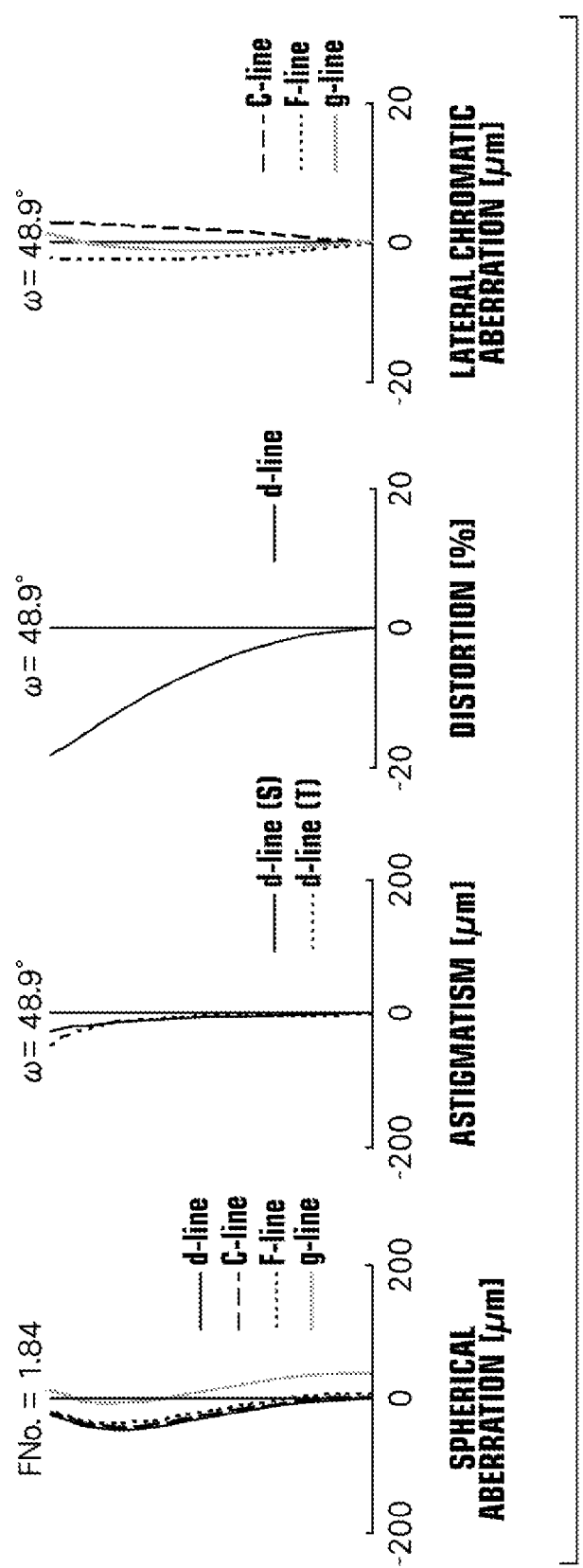
FIG. 11 is a collection of diagrams that illustrate aberrations of the imaging lens in Example 5 of the present invention.

Next, an imaging lens of Example 5 will be described. In the imaging lens of Example 5, a front group GF constitutes of five lenses, and a rear group GR consists of five lenses in which the object-side cemented lens CA, a single lens L8, and the image-side cemented lens CB are disposed in order from the object side. Note that only Example 5 illustrates an example in which two optical members PP1 and PP2 are arranged. FIG. 5 is a cross-sectional view illustrating the lens configuration of the imaging lens of Example 5. Further, Table 9 shows basic lens data, Table 10 shows data regarding specs, and FIG. 11 illustrates the aberrations.

TABLE 9

EXAMPLE 5/LENS DATA

| SURFACE NUMBERS | RADII OF CURVATURE | DISTANCES BETWEEN SURFACES | nd | vd |
|---|---|---|---|---|
| 1 | 41.08156 | 2.504 | 1.51633 | 64.14 |
| 2 | 149.89535 | 0.122 | | |
| 3 | 16.89654 | 1.820 | 1.80518 | 25.42 |
| 4 | 5.58217 | 3.206 | | |
| 5 | −149.51251 | 0.800 | 1.62041 | 60.29 |
| 6 | 6.55509 | 4.179 | | |
| 7 | 40.75878 | 5.010 | 1.48749 | 70.24 |
| 8 | 9.37897 | 4.500 | 1.80610 | 33.27 |
| 9 | −25.05255 | 3.179 | | |
| 10(STOP) | ∞ | 1.474 | | |
| 11 | 72.98676 | 3.968 | 1.48749 | 70.24 |
| 12 | −5.76420 | 0.800 | 1.84666 | 23.78 |
| 13 | −14.45572 | 0.200 | | |
| 14 | 19.07047 | 2.805 | 1.71299 | 53.87 |
| 15 | −26.89149 | 0.100 | | |
| 16 | 12.02229 | 0.872 | 1.90366 | 31.31 |
| 17 | 6.07890 | 2.796 | 1.49700 | 81.54 |
| 18 | −48.38604 | 5.000 | | |
| 19 | ∞ | 0.500 | 1.51633 | 64.14 |
| 20 | ∞ | 0.100 | | |
| 21 | ∞ | 0.400 | 1.51633 | 64.14 |
| 22 | ∞ | 2.339 | | |

TABLE 10

EXAMPLE 5/SPECS (d line)

| f | 4.096 |
|---|---|
| Bf | 8.033 |
| FNo. | 1.84 |
| 2ω[°] | 97.8 |

Figure 6:
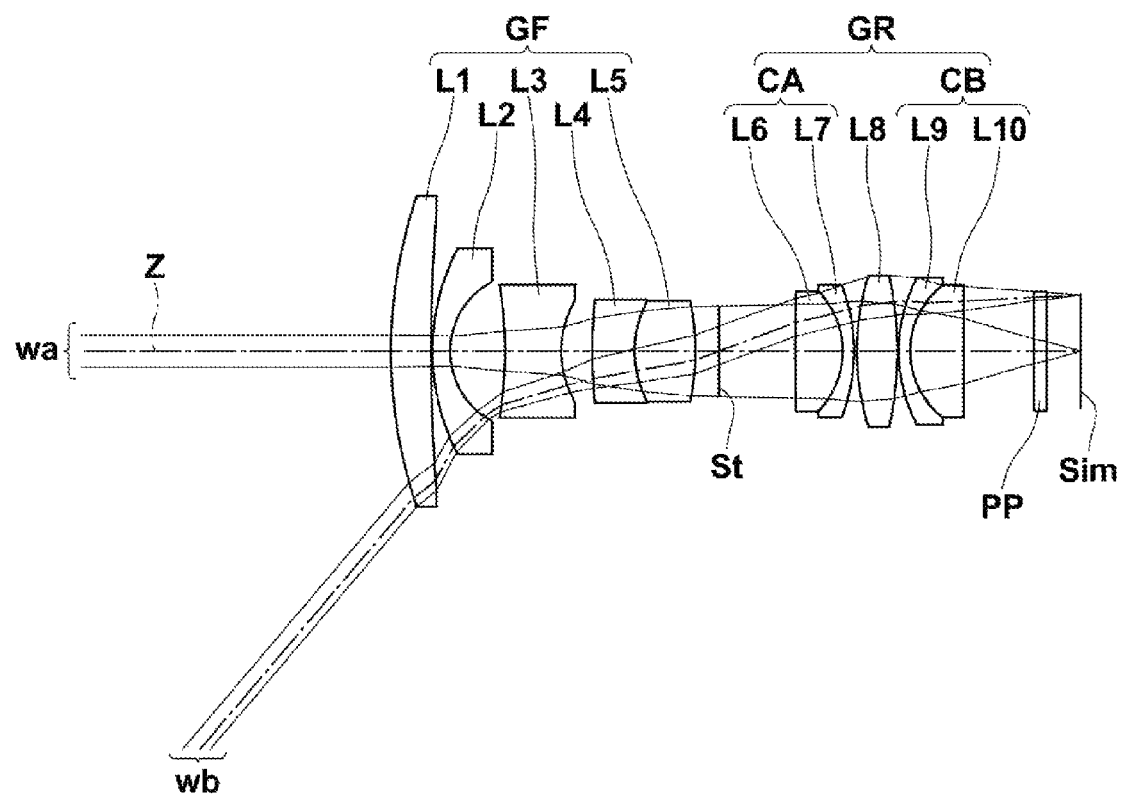
FIG. 6 is a cross-sectional diagram that illustrates the lens configuration of an imaging lens in Example 6 of the present invention.
Figure 12:
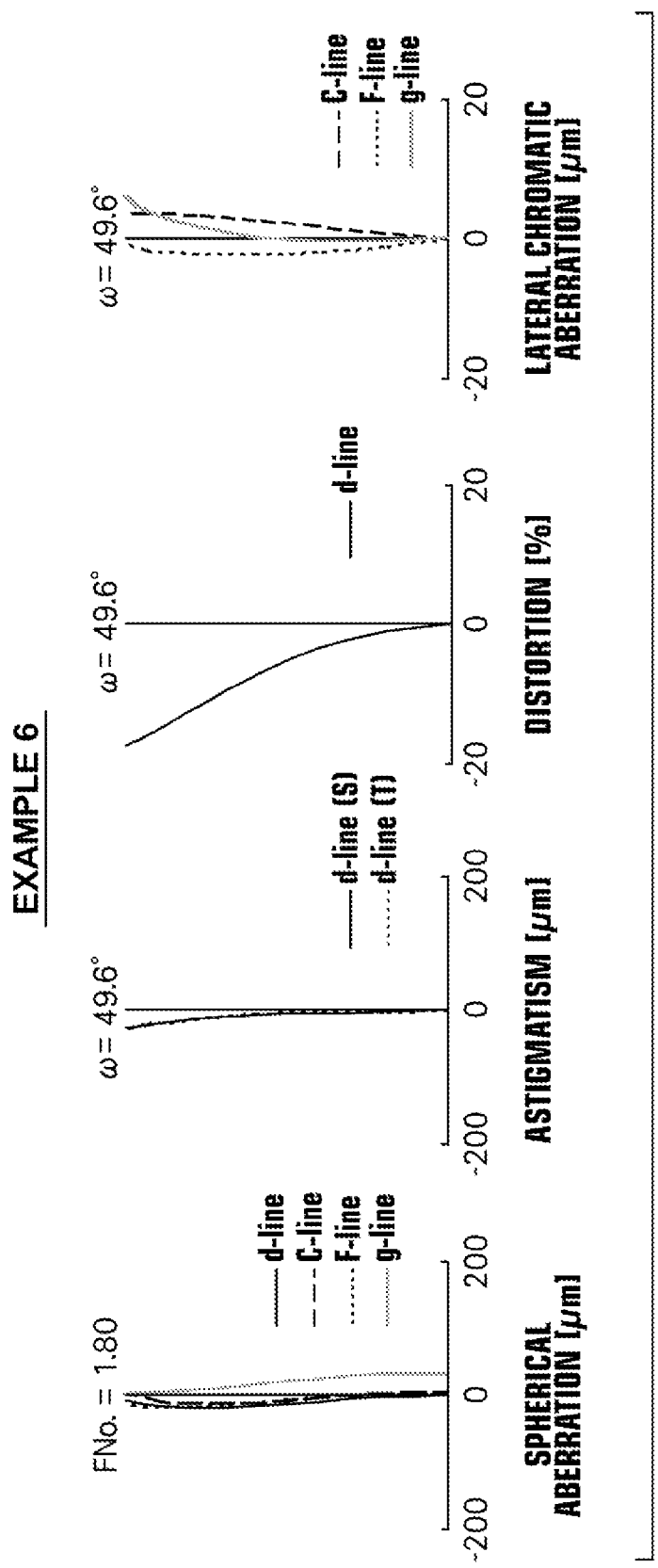
FIG. 12 is a collection of diagrams that illustrate aberrations of the imaging lens in Example 6 of the present invention.

Next, an imaging lens of Example 6 will be described. The imaging lens of Example 6 has the same configurations of the lens groups as those of the imaging lens in Example 5. FIG. 6 is a cross-sectional view illustrating the lens configuration of the imaging lens of Example 6. Further, regarding the imaging lens of Example 6, Table 11 shows basic lens data, Table 12 shows data regarding specs, and FIG. 12 illustrates the aberrations.

TABLE 11

EXAMPLE 6/LENS DATA

| SURFACE NUMBERS | RADII OF CURVATURE | DISTANCES BETWEEN SURFACES | nd | vd |
|---|---|---|---|---|
| 1 | 34.11452 | 2.837 | 1.51633 | 64.14 |
| 2 | 127.23100 | 0.100 | | |
| 3 | 15.81414 | 1.253 | 1.84666 | 23.78 |
| 4 | 5.60824 | 3.883 | | |

TABLE 11-continued

EXAMPLE 6/LENS DATA

| SURFACE NUMBERS | RADII OF CURVATURE | DISTANCES BETWEEN SURFACES | nd | vd |
|---|---|---|---|---|
| 5 | −28.52275 | 3.977 | 1.62280 | 57.05 |
| 6 | 7.17645 | 2.211 | | |
| 7 | 36.23205 | 3.010 | 1.61800 | 63.33 |
| 8 | 7.53791 | 4.294 | 1.80610 | 33.27 |
| 9 | −18.38807 | 1.670 | | |
| 10(STOP) | ∞ | 5.423 | | |
| 11 | 228.45717 | 3.346 | 1.48749 | 70.24 |
| 12 | −6.09012 | 0.800 | 1.84666 | 23.78 |
| 13 | −13.17053 | 0.200 | | |
| 14 | 18.00380 | 2.865 | 1.71299 | 53.87 |
| 15 | −25.24241 | 0.100 | | |
| 16 | 11.27333 | 0.810 | 1.90366 | 31.31 |
| 17 | 5.88952 | 3.783 | 1.49700 | 81.54 |
| 18 | ∞ | 5.000 | | |
| 19 | ∞ | 0.900 | 1.51633 | 64.14 |
| 20 | ∞ | 2.401 | | |

TABLE 12

EXAMPLE 6/SPECS (d line)

| | |
|---|---|
| f | 4.121 |
| Bf | 7.995 |
| FNo. | 1.80 |
| 2ω[°] | 99.2 |

Table 13 shows values corresponding to conditional formulae (1) through (8) of the imaging lenses for Examples 1 through 6. Note that in all of the Examples, the d line is a reference wavelength, and the values shown in Table 13 below are with respect to this reference wavelength.

TABLE 13

| NUMBERS OF FORMULAE | CONDITIONAL FORMULAE | EXAMPLE 1 | EXAMPLE 2 | EXAMPLE 3 | EXAMPLE 4 | EXAMPLE 5 | EXAMPLE 6 |
|---|---|---|---|---|---|---|---|
| (1) | NnA − NpA | 0.35917 | 0.28200 | 0.26518 | 0.35917 | 0.35917 | 0.35917 |
| (2) | vpA − vnA | 46.46 | 37.71 | 38.68 | 46.46 | 46.46 | 46.46 |
| (3) | NnB − NpB | 0.40666 | 0.01036 | 0.40259 | 0.40666 | 0.40666 | 0.40666 |
| (4) | vpB − vnB | 50.23 | 27.90 | 43.50 | 50.23 | 50.23 | 50.23 |
| (5) | f/fF | −0.207 | −0.188 | −0.172 | −0.054 | 0.029 | −0.087 |
| (6) | (Rc − Rd)/(Rc + Rd) | −0.464 | −0.124 | −0.349 | −1.088 | 0.000 | 0.000 |
| (7) | fA/fB | 6.503 | 2.355 | 2.028 | 1.655 | 4.618 | 1.494 |
| (8) | f/f123 | −0.505 | −0.598 | −0.511 | −0.902 | −0.805 | −0.957 |

It can be understood from the data above that all of the imaging lenses of Examples 1 through 13 satisfy conditional formulae (1) through (8) and have small F numbers with various aberrations corrected favorably.

Figure 13:
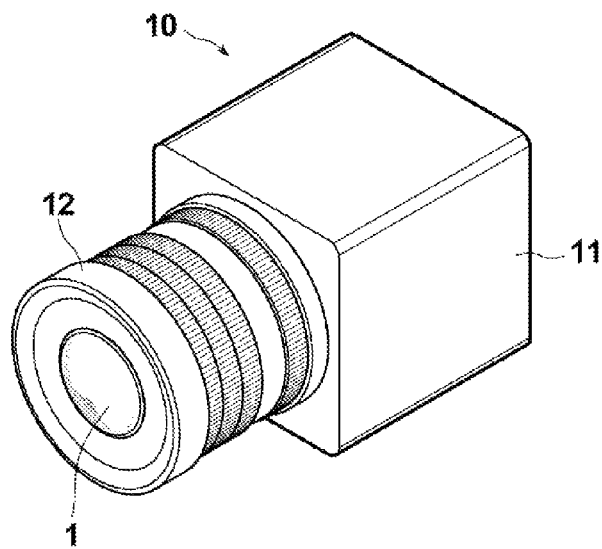
FIG. 13 is a perspective view that illustrates the front side of an imaging apparatus according to one embodiment of the present invention.

Next, one embodiment of the imaging apparatus according to the present invention will be described referring to FIG. 13. FIG. 13 illustrates the front side of a camera 10 which is a surveillance camera equipped with an imaging lens 1 according to the embodiment of the present invention.

This surveillance camera 10 includes a camera body 11 equipped with a lens barrel 12 housing the imaging lens 1 therewithin. The camera body 11 is provided with an image sensor (not shown) in the interior thereof. This image sensor, which photographs and converts optical images formed by the imaging lens 1 into electric signals, is constituted by a CCD (Charge Coupled Device), a CMOS (Complementary Metal Oxide Semiconductor), or the like, for example. Note that the image sensor is disposed such that the optical axis Z of the imaging lens 1 intersects with the center thereof.

The surveillance camera 10 of the present embodiment is equipped with the imaging lens 1 of the present invention. Therefore, bright and high-quality images can be obtained.

Figure 14:
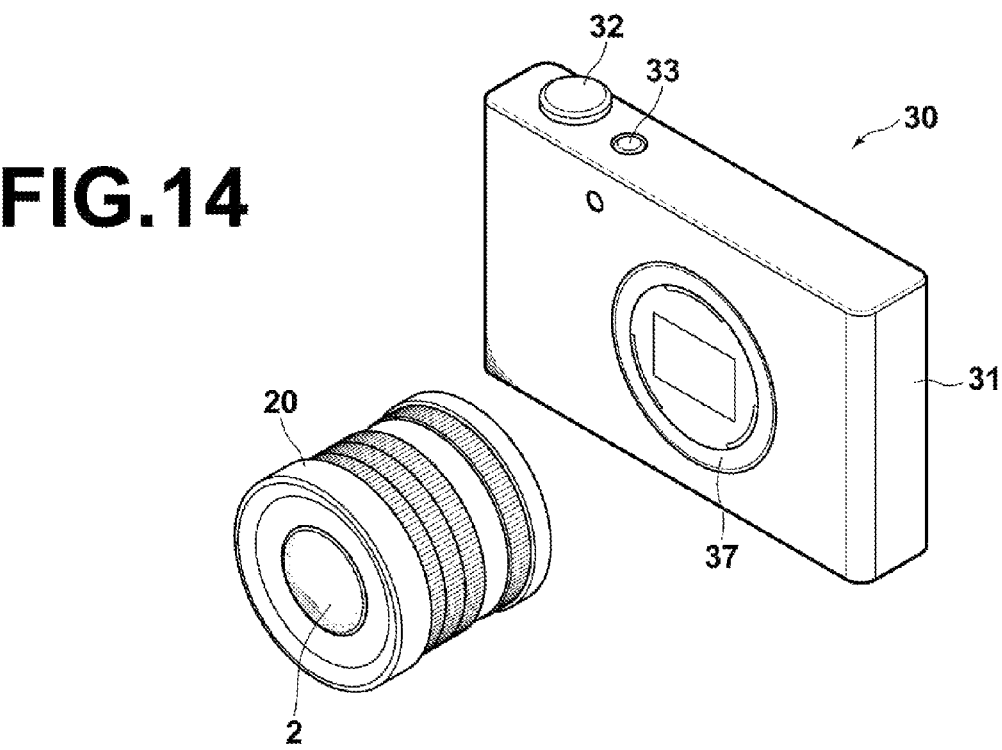
FIG. 14 is a perspective view that illustrates the front side of an imaging apparatus according to another embodiment of the present invention.
Figure 15:
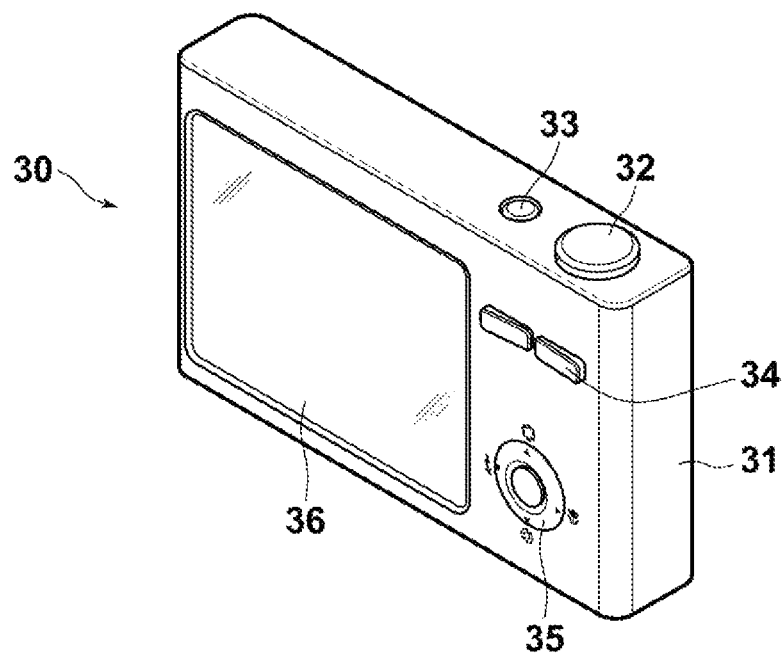
FIG. 15 is a perspective view that illustrates the back side of the imaging apparatus illustrated in FIG. 14.

Next, another embodiment of the imaging apparatus according to the present invention will be described referring to FIGS. 14 and 15. FIGS. 14 and 15 are perspective views of the front side and the back side of a camera 30, which is a non-reflex type digital camera equipped with a detachable interchangeable lens 20 that houses an imaging lens 2 according to the embodiment of the present invention within a lens barrel.

This camera 30 includes a camera body 31 provided with a shutter button 32 and a power source button 33 on the upper surface thereof. Further, operation sections 34 and 35 as well as a display section 36 are on the back surface of the camera body 31. The display section 36 displays photographed images and images to be photographed within the angle of view.

A photographing aperture, into which light from a photographing object enters, is provided in the center of the front surface of the camera body 31, and a mount 37 is provided on a position corresponding to the photographing aperture. Further, an interchangeable lens 20 is configured to be mounted to the camera body 31 through the mount 37.

The camera body 31 is provided with an image sensor (not shown), such as a CCD, and the like, which receives a subject image formed by the interchangeable lens 20 and outputs imaging signals in response thereto; a signal processing circuit which processes imaging signals output from the image sensor and generates images; a recording medium for recording the generated images; and the like. In this camera 30, a still image or a moving image is photographed by pressing a shutter button 32 and the image data obtained by this photography is recorded on the above recording medium.

The camera 30 of the present embodiment is equipped with the imaging lens 2 of the present invention. Therefore, bright and high-quality images can be obtained.

The present invention has been described with reference to the Embodiments and Examples. The present invention is not limited to the embodiments and the examples described above, and various modifications are possible. For example, values, such as the radius of curvature, the distances between surfaces, the refractive indices, the Abbe's numbers, aspheric surface coefficients of each lens, and the like are not limited to the values in the Examples above, but may be other values.

Further, the embodiment of the imaging apparatus were described referring to the drawings with a surveillance camera or a non-reflex (namely, a mirrorless) type digital camera as examples. However, the imaging apparatus of the present invention is not limited thereto, and can be applied to various imaging apparatuses, such as industrial cameras, single-lens reflex cameras, video cameras, digital cameras, movie cameras, and broadcasting cameras.

What is claimed is:

1. An imaging lens consisting of:
   in order from the object side,
   a front group including, in order from the most-object side,
   a first lens having a positive refractive power,
   a second lens having a negative refractive power, the second lens being of a meniscus shape with a concave surface toward the image side, and
   a third lens having a negative refractive power which are adjacently disposed,
   a stop, and
   a rear group consisting of two sets of cemented lenses having positive refractive powers and a single lens having a positive refractive power,
   the object-side cemented lens of the two sets of cemented lenses being formed by cementing, in order from the object side, a positive lens with a convex surface toward the image side and a negative meniscus lens together, and
   the image-side cemented lens of the two sets of cemented lenses being formed by cementing, in order from the object side, a negative meniscus lens with a concave surface toward the image side and a positive lens together, the image-side cemented lens being disposed at the most-image side in the rear group.

2. The imaging lens as defined in claim 1, wherein the first lens is of a shape with a convex surface toward the object side.

3. The imaging lens as defined in claim 1, wherein the front group includes a final lens, having a positive refractive power, of the front group at the most-image side.

4. The imaging lens as defined in claim 1, wherein the following conditional formulae (1) and (2) are satisfied:

$$0.05 < NnA - NpA < 0.8 \quad (1)$$

$$22 < vpA - vnA < 70 \quad (2)$$

where,
NnA is the refractive index of the negative lens of the object-side cemented lens with respect to the d line,
NpA is the refractive index of the positive lens of the object-side cemented lens with respect to the d line,
vpA is the Abbe's number of the positive lens of the object-side cemented lens with respect to the d line, and
vnA is the Abbe's number of the negative lens of the object-side cemented lens with respect to the d line.

5. The imaging lens as defined in claim 1, wherein the following conditional formulae (3) and (4) are satisfied:

$$0 < NnB - NpB < 0.8 \quad (3)$$

$$22 < vpB - vnB < 70 \quad (4)$$

where,
NnB is the refractive index of the negative lens of the image-side cemented lens with respect to the d line,
NpB is the refractive index of the positive lens of the image-side cemented lens with respect to the d line,
vpB is the Abbe's number of the positive lens of the image-side cemented lens with respect to the d line, and
vnB is the Abbe's number of the negative lens of the image-side cemented lens with respect to the d line.

6. The imaging lens as defined in claim 1, wherein the following conditional formula (5) is satisfied:

$$-0.5 < f/fF < 0.2 \quad (5)$$

where,
f is the focal length of the entire system, and
fF is the focal length of the front group.

7. The imaging lens as defined in claim 3, wherein the following conditional formula (6) is satisfied:

$$-10 < (Rc - Rd)/(Rc + Rd) \le 0 \quad (6)$$

where,
Rc is the radius of curvature of the image-side surface of a lens adjacent to the final lens of the front group in the front group, and
Rd is the radius of curvature of the object-side surface of the final lens of the front group.

8. The imaging lens as defined in claim 1, wherein the following conditional formula (7) is satisfied:

$$0.1 < fA/fB < 10 \quad (7)$$

where,
fA is the focal length of the object-side cemented lens, and
fB is the focal length of the image-side cemented lens.

9. The imaging lens as defined in claim 1, wherein the following conditional formula (8) is satisfied:

$$-2 < f/f123 < -0.3 \quad (8),$$

where,
f is the focal length of the entire system, and
f123 is the combined focal length of the first lens through the third lens.

10. An imaging lens consisting of:
    in order from the object side,
    a front group consisting of, in order from the most-object side,
    a first lens having a positive refractive power,
    a second lens having a negative refractive power,
    a third lens having a negative refractive power which are adjacently disposed,
    a fourth lens having a negative refractive power, and
    a final lens disposed at the most-image side of the front group,
    a stop, and
    a rear group consisting of two sets of cemented lenses having positive refractive powers and a single lens having a positive refractive power,
    the object-side cemented lens of the two sets of cemented lenses being formed by cementing, in order from the object side, a positive lens with a convex surface toward the image side and a negative meniscus lens together, and
    the image-side cemented lens of the two sets of cemented lenses being formed by cementing, in order from the object side, a negative meniscus lens with a concave surface toward the image side and a positive lens together, the image-side cemented lens being disposed at the most-image side in the rear group.

11. The imaging lens as defined in claim 1, wherein the front group consists of, in order from the object side, the first lens,
the second lens,
the third lens,
a fourth lens that is a meniscus lens with a concave surface toward the object side,
a fifth lens that is a negative meniscus lens with a concave surface toward the image side, and
the final lens of the front group disposed at the most-image side.

12. The imaging lens as defined in claim 1, wherein the rear group consists of, in order from the object side,
the single lens,
the object-side cemented lens, and
the image-side cemented lens.

13. The imaging lens as defined in claim 1, wherein the rear group consists of, in order from the object side,
the object-side cemented lens,
the single lens, and
the image-side cemented lens.

14. The imaging lens as defined in claim 4, wherein at least one of the following conditional formulae (1-1) and (2-1) is satisfied:

$$0.25 < NnA - NpA < 0.6 \quad (1\text{-}1)$$

$$25 < \nu pA - \nu nA < 65 \quad (2\text{-}1)$$

where,
NnA is the refractive index of the negative lens of the object-side cemented lens with respect to the d line,
NpA is the refractive index of the positive lens of the object-side cemented lens with respect to the d line,
νpA is the Abbe's number of the positive lens of the object-side cemented lens with respect to the d line, and
νnA is the Abbe's number of the negative lens of the object-side cemented lens with respect to the d line.

15. The imaging lens as defined in claim 5, wherein at least one of the following conditional formulae (3-1) and/or (4-1) is satisfied:

$$0.25 < NnB - NpB < 0.6 \quad (3\text{-}1)$$

$$25 < \nu pB - \nu nB < 65 \quad (4\text{-}1)$$

where,
NnB is the refractive index of the negative lens of the image-side cemented lens with respect to the d line,
NpB is the refractive index of the positive lens of the image-side cemented lens with respect to the d line,
νpB is the Abbe's number of the positive lens of the image-side cemented lens with respect to the d line, and
νnB is the Abbe's number of the negative lens of the image-side cemented lens with respect to the d line.

16. The imaging lens as defined in claim 6, wherein the following conditional formula (5-1) is satisfied:

$$-0.45 < f/fF < 0.1 \quad (5\text{-}1)$$

where,
f is the focal length of the entire system, and
fF is the focal length of the front group.

17. The imaging lens as defined in claim 7, wherein the following conditional formula (6-1) is satisfied:

$$-2 < (Rc - Rd)/(Rc + Rd) \leq 0 \quad (6\text{-}1)$$

where,
Rc is the radius of curvature of the image-side surface of a lens adjacent to the final lens of the front group within the front group, and
Rd is the radius of curvature of the object-side surface of the final lens of the front group.

18. The imaging lens as defined in claim 8, wherein the following conditional formula (7-1) is satisfied:

$$0.2 < fA/fB < 8 \quad (7\text{-}1)$$

where,
fA is the focal length of the object-side cemented lens, and
fB is the focal length of the image-side cemented lens.

19. An imaging apparatus equipped with the imaging lens as defined in claim 1.

* * * * *